United States Patent
Copeland et al.

(10) Patent No.: US 6,782,209 B2
(45) Date of Patent: Aug. 24, 2004

(54) OPTICAL TRANSMISSION SYSTEMS INCLUDING OPTICAL AMPLIFIERS AND METHODS

(75) Inventors: David J. Copeland, Kensington, MD (US); John J. Veselka, Jr., Clarksville, MD (US); Donald M. Cornwell, Jr., Silver Spring, MD (US); Thomas D. Stephens, Columbia, MD (US); Dean M. Smith, Morningside, MD (US); Mark A. Laliberte, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 519 days.

(21) Appl. No.: 09/798,010

(22) Filed: Mar. 2, 2001

(65) Prior Publication Data

US 2001/0028490 A1 Oct. 11, 2001

Related U.S. Application Data

(60) Provisional application No. 60/186,909, filed on Mar. 3, 2000.

(51) Int. Cl.$^7$ .................. H04J 14/02; H04B 10/00
(52) U.S. Cl. .................. 398/157; 398/162; 398/196; 385/24
(58) Field of Search .............. 372/6; 385/24; 398/157, 196, 197, 82, 92, 162

(56) References Cited

U.S. PATENT DOCUMENTS

| | | | |
|---|---|---|---|
| 4,401,364 A | | 8/1983 | Mochizuki |
| 4,616,898 A | | 10/1986 | Hicks |
| 4,805,977 A | | 2/1989 | Tamura et al. |
| 5,513,029 A | * | 4/1996 | Roberts ............... 398/32 |
| 5,930,029 A | * | 7/1999 | Mehuys ............ 359/341.33 |
| 6,081,366 A | * | 6/2000 | Kidorf et al. ...... 359/341.32 |
| 6,421,172 B1 | * | 7/2002 | Flood et al. ....... 359/341.41 |
| 6,459,527 B1 | * | 10/2002 | Kosaka ............. 359/337.1 |

FOREIGN PATENT DOCUMENTS

EP  0734 105 A2  9/1996

* cited by examiner

Primary Examiner—Hung N. Ngo

(57) ABSTRACT

Optical transmission systems of the present invention include at least one optical amplifier generally including an optical signal amplifying medium supplied with pump power in the form of optical energy in via an optical pump source. The pump source includes multiple optical sources, at least two of which provide optical energy in first and second wavelength ranges separated by a frequency difference. The amplifier includes a wavelength controller configured to adjust the wavelength range of at least one of the optical sources to vary the frequency difference in a manner sufficient to vary optical intensity noise produced when the optical energy from the multiple optical sources is combined.

12 Claims, 5 Drawing Sheets

OPTICAL TRANSMISSION SYSTEMS INCLUDING OPTICAL AMPLIFIERS AND METHODS

CROSS-REFERENCE TO RELATED APPLICATIONS

This application claims priority from and is a continuation-in-part ("CIP") of commonly assigned U.S. Provisional Application No. 60/186,909 filed Mar. 3, 2000, which is incorporated herein by reference.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention relates to amplifying optical signals in optical transmission systems and controlling signal channel power levels and nonlinear interactions between signal channels in the optical systems.

Optical communication systems transmit information by generating and sending optical signals that correspond to the information through optical transmission fiber. Information transported by the optical systems can include audio, video, data, or any other information format. The optical systems can be used in telephone and cable television systems, LAN, WAN, and MAN systems, as well as other communication systems. Information can be optically transmitted using a broad range of frequencies/wavelengths, each of which is suitable for high speed data transmission and is generally unaffected by conditions external to the fiber, such as electrical interference.

The present invention is directed generally to optical transmission systems. More particularly, the invention is directed toward optical transmission systems including higher performance optical amplifiers.

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information transmission capacities than traditional electrical communication systems. Information can be transported through optical systems in audio, video, data, or other signal format analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals into a higher bit rate signals that can be transported on a single optical wavelength. The low bit rate information carried by the TDM optical signal can then be separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, typically in the infrared portion of the spectrum. The pluralities of information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems were not initially deployed, in part, because of the high cost of electrical signal regeneration equipment required approximately every 20–50 km to compensate for signal attenuation for each optical wavelength throughout the system. The development of the erbium doped fiber optical amplifier (EDFA) provided a cost effective means to optically amplify attenuated optical signal wavelengths in the 1550 nm range. In addition, the 1550 nm signal wavelength range coincides with a low loss transmission window in silica based optical fibers, which allowed EDFAs to be spaced further apart than conventional electrical regenerators.

The use of EDFAs essentially eliminated the need for, and the associated costs of, electrical signal regeneration/amplification equipment to compensate for signal attenuation in many systems. The dramatic reduction in the number of electrical regenerators in the systems, made the installation of WDM systems in the remaining electrical regenerators-a cost effective means to increase optical network capacity.

WDM systems have quickly expanded to fill the limited amplifier bandwidth of EDFAs. New erbium-based fiber amplifiers (L-band) have been developed to expand the bandwidth of erbium-based optical amplifiers. Also, new transmission fiber designs are being developed to provide for lower loss transmission in the 1380–1530 nm and 1600–1700 nm ranges to provide additional capacity for future systems.

Raman fiber amplifiers ("RFAs") are also being investigated for use in wide bandwidth, e.g., 100 nm, optical amplifiers, but RFAs generally make less efficient use of pump power than EDFAs. Therefore, RFAs have not been deployed in commercial systems because significant pump powers on the order of hundreds of milliwatts are required to achieve the required levels of amplification.

RFAs do, however, have appeal as a viable option for next generation optical amplifiers, because RFAs provide low noise, wide bandwidths, and wavelength flexible gain. Commonly assigned U.S. patent application Ser. Nos. 09/119,556 and 09/253,819, which are incorporated herein by reference, describe RFAs that can be deployed in existing fiber optic networks having various fiber designs and compositions and over a wide range of signal wavelengths.

RFAs are theoretically scalable to provide amplification over a range of bandwidths and power. However, the amplification bandwidth and power is limited, in part, by the amount of pump power that can be delivered to the fiber amplifier and the interaction between the wavelengths in the fiber. The capability to provide higher pump powers is essential for continued development of optical amplifiers and optical systems to meet the requirements of next generation optical systems.

BRIEF SUMMARY OF THE INVENTION

The systems, apparatuses, and methods of the present invention address the above needs to provide higher performance optical amplifiers and systems. The optical systems generally include at least one optical transmitter configured to transmit information via at least one optical signal wavelength, or channel, to at least one optical receiver via optical transmission media, such as an optical fiber. The system will also include at least one optical amplifier disposed between the transmitters and receivers to overcome various signal power losses, such as media attenuation, combining, splitting, etc. in the system.

The optical amplifier will generally include an optical signal amplifying medium supplied with pump power in the form of optical energy in one or more pump wavelengths via an optical pump source. The pump source includes multiple optical sources, at least two of which have first and second wavelength ranges separated by a frequency difference. The amplifier includes a wavelength controller configured to adjust the wavelength range of at least one of the optical sources to vary the frequency difference in a manner sufficient to vary optical noise produced as a result of the frequency difference. The controller can be used to decrease the amplitude of intensity noise produced at the difference frequency or vary the frequency difference shift the frequency at which the noise is produced by the different wavelengths.

In this manner, pump power provided by optical sources as optical energy can be combined and the optical noise produced as a result of the combination of the optical energy can be controlled effectively. These advantages and others will become apparent from the following detailed description.

BRIEF DESCRIPTION OF THE DRAWINGS

Embodiments of the present invention will now be described, by way of example only, with reference to the accompanying drawings for the purpose of illustrating present embodiments only and not for purposes of limiting the same, wherein like members bear like reference numerals and.

DETAILED DESCRIPTION OF THE INVENTION

Figure 1:
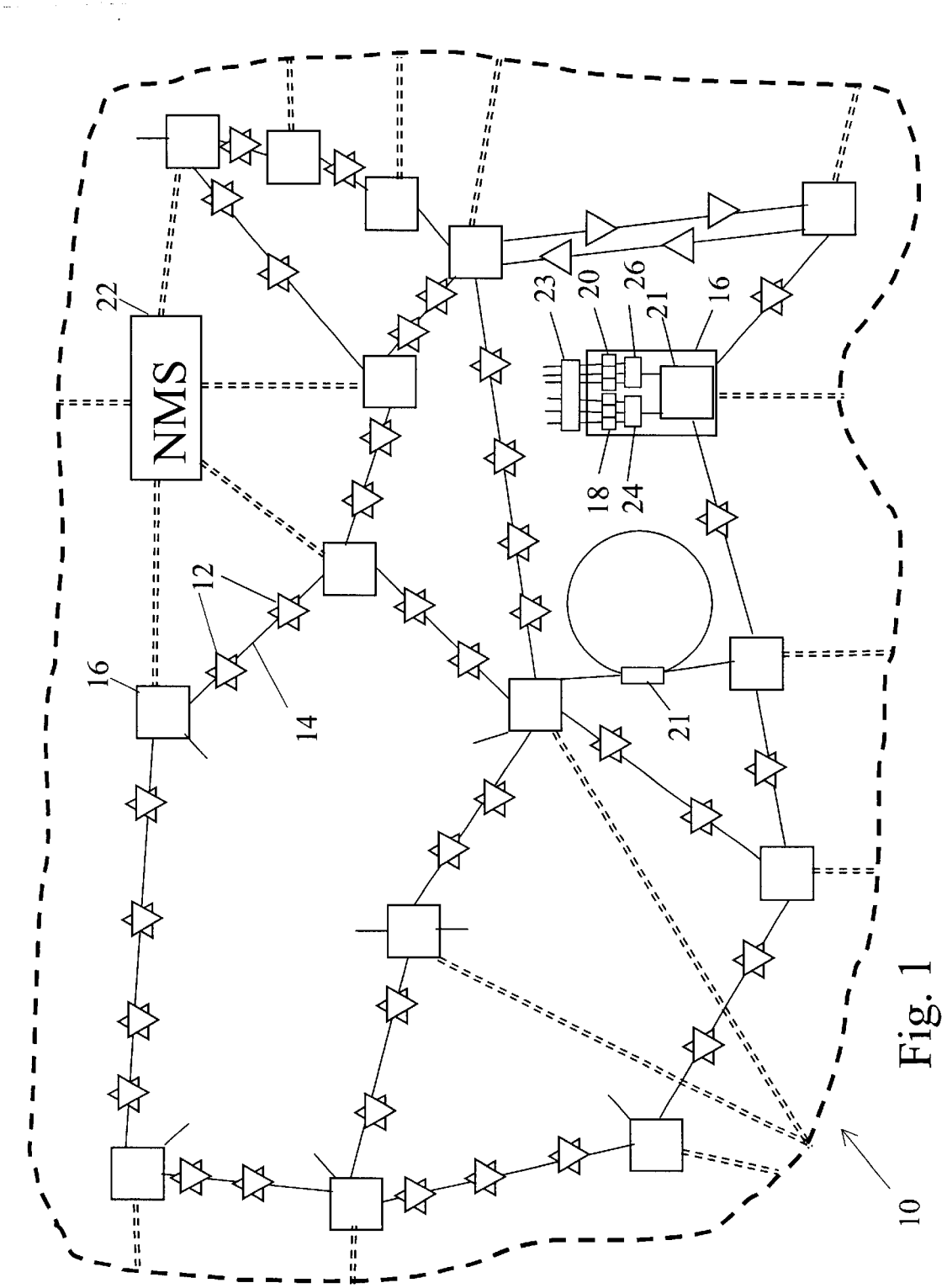
FIGS. 1–2 show optical system embodiments.

FIG. 1 shows a multi-dimensional network embodiment of an optical system 10 of the present invention. The optical system 10 includes an optical amplifier 12 disposed along an optical transmission medium, such as an optical fiber 14, to optically amplify optical signals passing between optical processing nodes 16. The optical signals can be transmitted in discrete signal wavelengths, or signal channels, $\lambda_{si}$, either uni-directionally or bi-directionally through the medium. One or more transmitters 18 can be included in the nodes 16 and configured to transmit information via the optical signals in one or more information carrying signal wavelengths, or signal channels, $\lambda_{si}$ to one or more optical receivers 20 in other nodes 16.

A network management system 22 can be employed to provide control over the network elements. The network management system 22 can communicate with the various nodes and elements in the optical systems 10 via wide area networks external to the system 10 and/or supervisory optical channels within the system 10.

Figure 2:
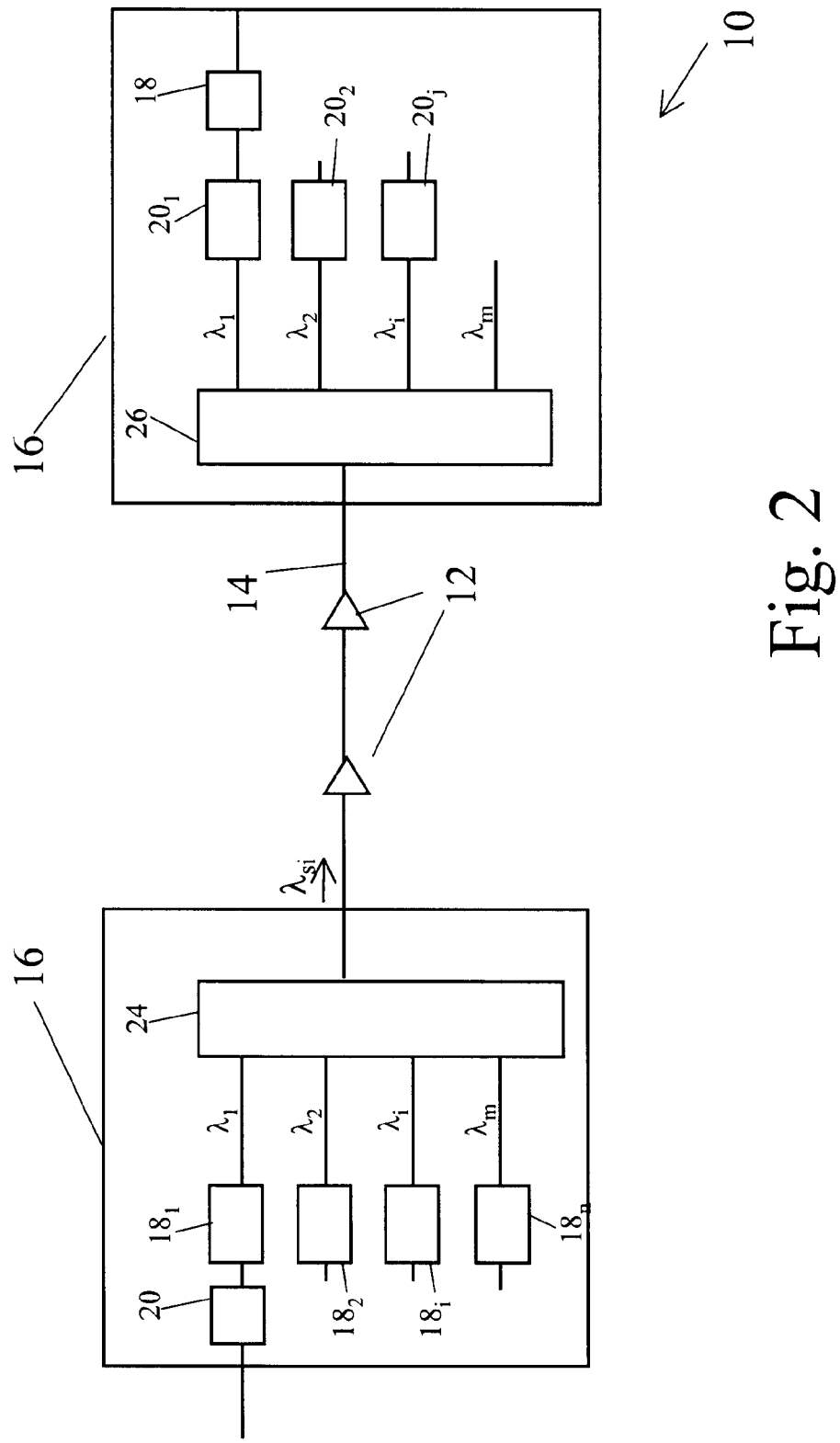

FIG. 2 shows an alternative network embodiment in the system 10 is deployed in a point-to-point link. It will be appreciated that one or more serially connected point to point links can be interconnected to form larger networks, such as that shown in FIG. 1.

Returning to FIG. 1, the optical processing nodes 16 may also include other optical components, such as one or more add/drop devices and optical and electrical switches/routers/cross-connects 21 interconnecting the transmitters 18 and receivers 20. For example, broadcast and/or wavelength reusable, add/drop devices, and optical and electrical/digital cross connect switches and routers can be configured via the network management system 22 in various topologies, i.e., rings, mesh, etc. to provide a desired network connectivity.

The transmitters 18 used in the system 10 will generally include a narrow bandwidth laser optical source that provides an optical carrier. The transmitters 18 also can include other coherent narrow or broad band sources, such as sliced spectrum sources, as well as suitable incoherent optical sources as appropriate. Information can be imparted to the optical carrier either by directly modulating the optical source or by externally modulating the optical carrier emitted by the source. Alternatively, the information can be imparted to an electrical carrier that can be upconverted using the optical carrier onto an optical wavelength to produce the optical signal. Similarly, the optical receiver 20 used in the present invention can include various detection techniques, such coherent detection, optical filtering and direct detection, and combinations thereof.

The transmitters 18 and receivers 20 can be also connected to interfacial devices 23, such as electrical and optical cross-connect switches, IP routers, etc., to provide interface flexibility within, and at the periphery of, the optical system 10. The interfacial devices 23 can be configured to receive, groom, aggregate, convert, switch, and provide information in one or more various protocols, encoding schemes, and bit rates to the transmitters 22, and perform the converse function for the receivers 24. The interfacial devices 23 also can be used to provide protection switching in various nodes 16 depending upon the configuration.

Generally speaking, N transmitters 18 can be used to transmit M different signal wavelengths to J different receivers 20. In various embodiments, one or more of the transmitters 18 and/or receivers 20 can be wavelength tunable to provide wavelength allocation flexibility in the optical system 10.

Optical combiners 24 can be used to combine the multiple signal channels into WDM optical signals and pump wavelengths $\lambda_{pi}$. Likewise, optical distributors 26 can be provided to distribute the optical signal to the receivers $20_j$ and optical signal and pump wavelengths $\lambda_{pi}$ to multiple paths.

The optical combiners 24 and distributors 26 can include various multi-port devices, such as wavelength selective and non-selective ("passive"), fiber and free space devices, as well as polarization sensitive devices. The multi-port devices can various devices, such as circulators, passive, WDM, and polarization couplers/splitters, dichroic devices, prisms, diffraction gratings, arrayed waveguides, etc.

The multi-port devices can be used alone or in various combinations along with various tunable or fixed wavelength filters in the optical combiners 24 and distributors 26. The filters can include various transmissive or reflective, narrow or broad band filters, such as Bragg gratings, Mach-Zehnder, Fabry-Perot and dichroic filters, etc. Furthermore, the combiners 24 and distributors 26 can include one or more stages incorporating various multi-port device and filter combinations to multiplex, consolidate, demultiplex, multicast, and/or broadcast signal channels $\lambda_{si}$ and pump wavelengths $\lambda_{pi}$ in the optical systems 10.

Figure 3:
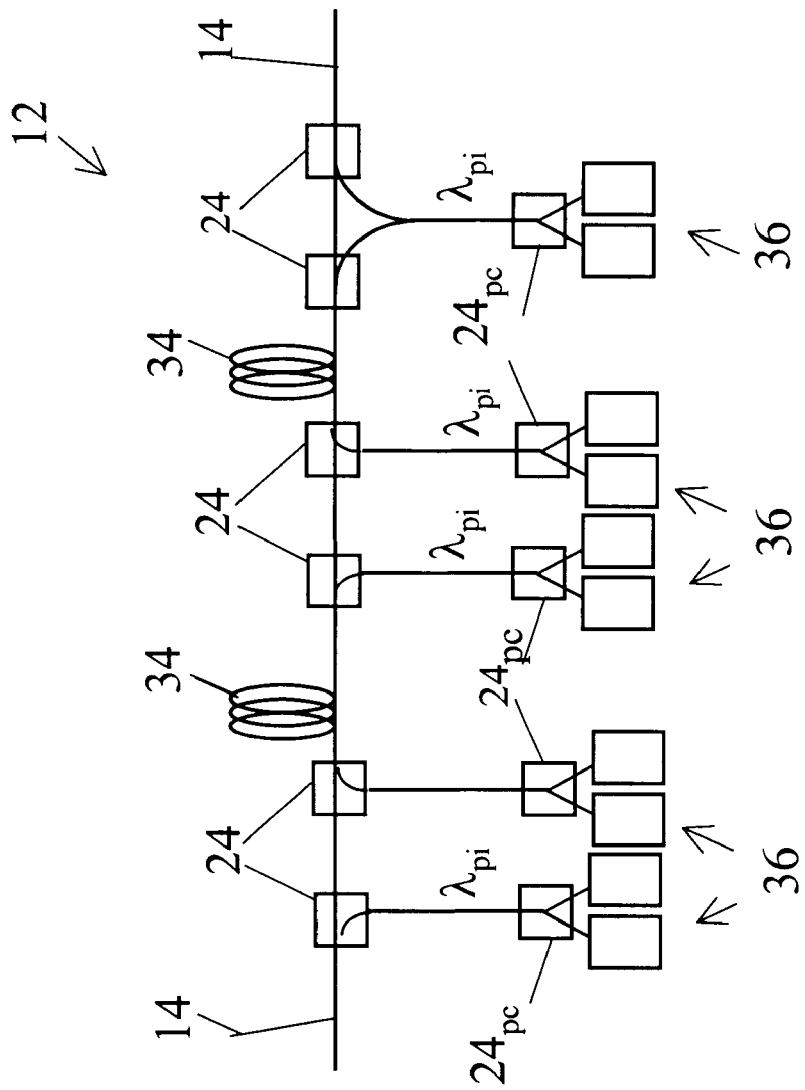
FIGS. 3–5 shows exemplary optical amplifier embodiments.

As shown in FIG. 3, the optical amplifiers 12 generally include an optical amplifying medium supplied with optical energy, or power, from a power source. For the sake of clarity, the optical amplifier 12 will be generally described in terms of an amplifying fiber 34 supplied with pump power in the form of optical energy from one or more pump sources 36. It will be appreciated that optical amplifiers 12 could include planar optical amplifying devices, and can be used in combination with semiconductor amplifiers.

The amplifying fiber 34 will generally be a doped and/or Raman fiber supplied with pump power in one or more pump wavelengths $\lambda_{pi}$ suitable for amplifying the signal wavelengths $\lambda_{si}$ passing through the amplifying fiber 34. One or more dopants can be used in the doped amplifying fiber 34, such as Er, other rare earth elements, as well as other dopants. The Raman fibers can include various silica-based fibers, e.g., pure, P-doped and/or Ge-doped silica fibers, such as those commonly used as transmission fiber, dispersion compensating fiber, etc., as well as other fiber material suitable for providing Raman gain. The doped and Raman fiber can be supplied in optical energy in various pump wavelengths to amplify signal channels in other wavelengths. For example, signal channels in the 1550 nm wavelength range can be amplified by pumping an erbium doped fiber with pump power at various wavelengths, such as 1480, and 980 nm. Likewise, Raman fibers can be supplied with pump power over a wavelength range, such as 1450–1480 nm to amplify signal channels in the 1550 nm wavelength range. Other signal wavelengths ranges can also be employed, for example 1300 nm, in the optical system 10 as may be desired.

The amplifying fiber 34 can have the same or different transmission and amplification characteristics than the transmission fiber 14. For example, dispersion compensating fiber, dispersion shifted fibers, standard single mode fiber and other fiber types can be intermixed as or with the transmission fiber 14 depending upon the system configuration. Thus, the amplifying fiber 34 can serve multiple purposes in the optical system, such as performing dispersion compensation and different levels of amplification, as well as lossless transmission and variable attenuation, of the signal wavelengths $\lambda_{si}$.

The optical amplifier 12 can also include one or more serial and/or parallel amplifier stages, which may include combinations of one or more, distributed and concentrated amplifier stages. The optical amplifiers 12 may also include remotely pumped doped fiber or Raman amplifying fibers $34_i$ having different amplification and transmission characteristics, e.g., dispersion, etc., than the transmission fiber 14. The remotely pumped amplifying fiber $34_i$ can be pumped with excess pump power supplied to provide Raman gain in the transmission fiber 14 or via a separate fiber. In addition, the optical amplifier can include short lumped doped fiber amplifier stages operated in deep saturation using pump power being supplied to other stages.

Other optical signal varying devices, such attenuators, filters, isolators, and equalizers can be deployed before, between, and after various stages of the amplifier 12 to decrease the effective loss associated with devices. Similarly, signal processing devices, such as add/drop devices, routers, etc. can be included proximate the various amplifier stages.

As further shown in FIG. 3, optical energy can be supplied to the amplifying fiber 34 in counter-propagating and/or co-propagating directions with respect to the propagation of the signal wavelengths $\lambda_{si}$. It will be appreciated that in a bi-directional system 10, the pump wavelength $\lambda_{pi}$ will be counter-propagating relative to signal wavelengths $\lambda_{si}$ in one direction as well as co-propagating relative to signal wavelengths $\lambda_{si}$ in the other direction.

Pump power can be supplied separately to each amplifier stage or the pump power can be shared by splitting the pump power before it is introduced into the amplifier or by streaming excess pump power from one stage to another. In addition, pump reflectors can be used to increase the pump power utilization in one or more stages. The pump wavelengths $\lambda_{pi}$ can be combined using combiners 24, such as fused tapered and dichroic couplers, polarization combiners, etc., as previously discussed can be used to introduce the optical energy into the fiber 14.

The pump source 36 can include one or more narrow and broad band pumps in various combinations of coherent, e.g., lasers, and incoherent, e.g., resonators, optical sources. The lasers can include single or multiple mode lasers, such as semiconductor diode lasers, employing both internal and/or external lasing cavities. For example, an external laser cavity can be established by providing an anti-reflective ("AR") coating on the output facet of the laser diode and providing a reflector, such as a fiber Bragg grating, external to the cavity. In addition, cascaded Raman resonators or other fiber lasers, such as erbium, can be provided in the pump source to directly pump the amplifying media or to amplify other pumps. An example of using fiber lasers and other resonators to amplify low power laser diodes is described in commonly assigned U.S. patent application Ser. No. 09/517,661 filed on Mar. 3, 2000 and incorporated herein by reference. Also, it may be desirable to use various coherent and incoherent sources in combination in the pump source.

In co-pumped Raman amplifiers, noise in the pump wavelengths can be more easily transferred onto the signal channels than in counter-pumped Raman amplifiers due to the relative velocities between the pump wavelengths and the signal wavelengths. Therefore, it is desirable to use pump source 36 that have with low noise characteristics, such as single stripe diodes. Also, the pump sources 34 can generally be constructed using fiber Bragg grating in polarization maintaining ("PM") fiber pigtails on diode lasers as discussed in the incorporated applications. The positioning of the Bragg grating, while not generally affecting the pump wavelength bandwidth can affect the noise spectra of the optical energy. Therefore, it is generally desirable to position the Bragg grating in the PM pigtail, such that any reflection noise generated is at sufficiently high frequencies that the noise will not be imprinted on the signal channels.

Additionally, the Raman gain achieved in the span is dependent upon the relative polarization of the signal channels and the pump wavelengths. Polarization dependent gain can by reduced or eliminated by depolarizing the pump light. Linearly polarized output from these pumps can be coupled to polarization maintaining fiber (PMF) with its electric field vector polarized at 45 degrees to a polarization axis of the PMF. The polarization state of the different wavelength components of the light will be transformed by different amounts. The light is effectively depolarized at a PMF length in which the difference in the number of beat lengths traversed by the different wavelength components is greater than one-half of a beat length. When a Raman amplifier is pumped with this depolarized light the relative polarization between the pump light and the signal light effectively does not vary even though the state of polarization of the signal channels are changing. For example, a 1-nm linewidth pump wavelength would be depolarized after propagation through about 10 meters of PMF assuming a typical PMF beat length of ~1 cm. Alternatively, a polarization splitter/combiner 24 can be used to combine the different wavelengths and PMF depolarizer can be placed after the polarization combiner to depolarize the light from both pumps.

Some higher power applications require pumps of multiple pumps at the same wavelengths to be multiplexed together, such as embodiments shown in FIG. 3, to achieve the necessary power or to provide redundancy in the system. In these embodiments, polarization combiners $24_{pc}$ can be used to combine the light from two pumps having nominally the same wavelength range ("emission spectra") to provide depolarized light at the wavelength. For example, two 1450 nm laser diodes can be provided with PM pigtailed to maintain polarization of the light and coupled to the polarization combiner $24_{pc}$ in orthogonal polarizations, resulting in depolarized light at 1450 nm, if the diodes are operated at equal power.

A difficulty with combining light from multiple sources having nominally the same wavelength is that the resulting light beam can have higher noise levels than the constituent light from any individual source. The increased noise results from the interaction, or beating, that occurs between modes of light at different frequencies when combined from different sources. The resultant intensity noise is sometimes referred to as beat noise.

The noise is generated at a frequency equal to the frequency difference between the modes. When these pumps are used to provide Raman amplification, in particular co-propagating amplification, of the signal wavelength, the noise produced by the modal interactions can be coupled onto the signal channels. If the frequency difference between the modes is within the information band of the signal, then intensity noise at the difference frequency will be detected at the receiver.

In another aspect of the present invention the pump wavelengths are controlled so that the frequency difference between modes when the pump wavelengths are combined is not within the information band, i.e., bit rate, of the signal channels. For example, <2.5 GHz for an OC-48 channel and <10 GHz for an OC-192 channel. This can be accomplished by deriving an error signal based on the optical noise produced by the frequency difference. The error signal can be used to adjust characteristics, such as temperature and drive current, of one or more of the pump lasers to reduce the error signal.

A number of methods can be used to control the frequency difference of the pumps. For example, an error signal can be derived from one or more of the following measurements:

1. A measurement of the intensity noise in the information band that is on the signals at the output of the amplifier.

Figure 4:
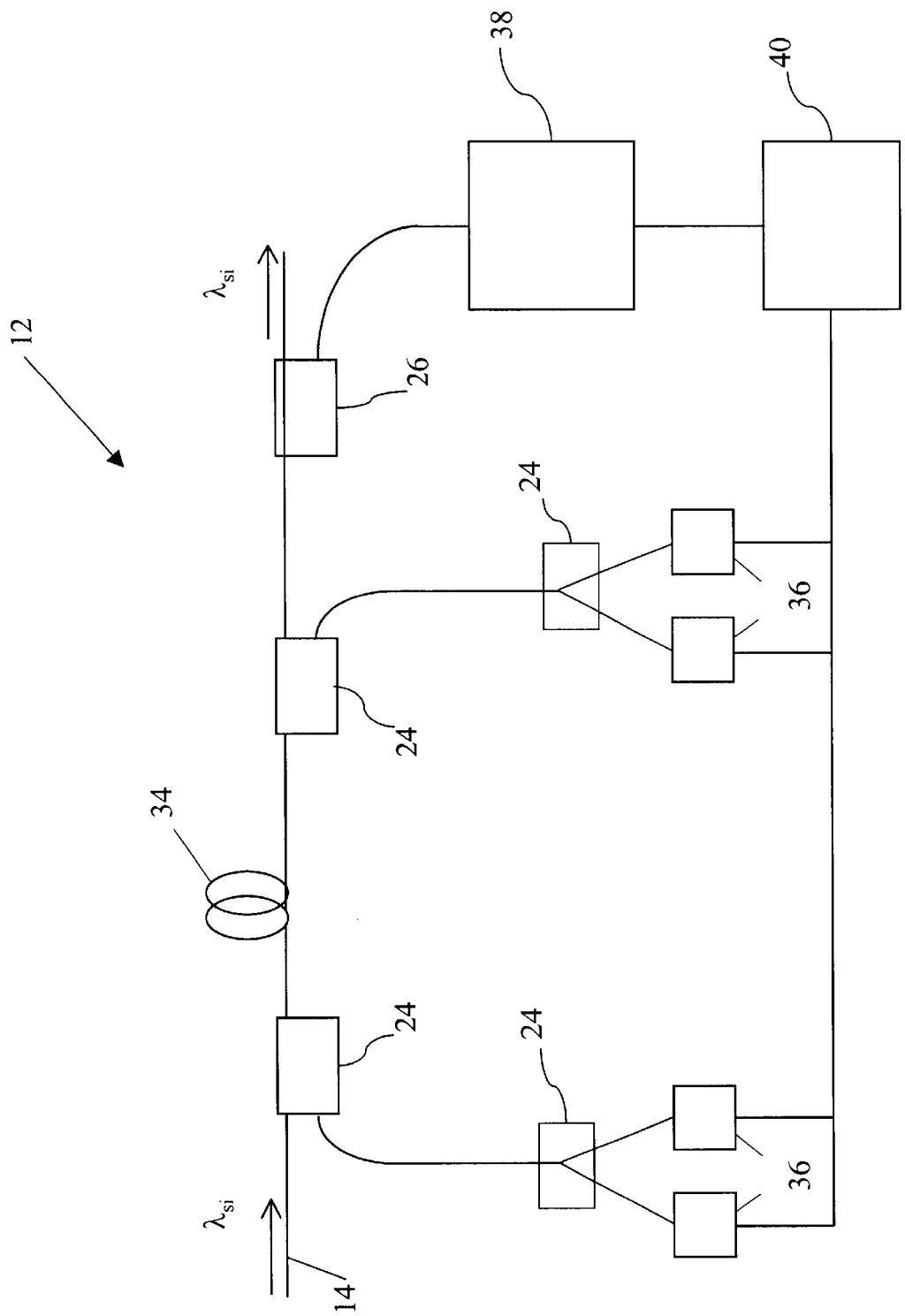

As shown in FIG. 4, an optical distributor 26, such as a low ratio tap coupler, can be provide within or after the amplifying medium 34 to tap a portion of the optical signal power passing through the fiber 14. A detector 38 can be provided to detect noise in the information band. For example, an optical to electrical converter, such as a photodiode, can be provided with an input to receive an optical signal and an output to provide an electrical signal corresponding to the optical noise carried on the input optical signal.

A wavelength controller 40 is provided to control the output wavelength of the plurality of optical sources 36 that are being used to provide optical energy to the amplifying media 34. The wavelength controller can be any processor capable of receiving input electrical signals representing the optical noise from the detector 38 and providing an output to control the optical source output wavelength in response to the noise signals. For example, a processor can be used to perform the controlling function, such as controlling the current supplied from a current source or the set point of a temperature electric cooler. In addition, multiple processors may be employed to perform the different functions, such as interpreting the noise signals provided by the detector 38 and controlling a current and temperature control circuit associated with one or more of the optical sources.

2. A measurement of the difference frequencies between the pump wavelengths can be used to control the intensity noise produced by the modal interactions in the optical energy provided by the optical sources. The measurement can be performed by a number of methods, such as:

By measuring the wavelength or frequency of each spectral component of the pump light and then computing an expected noise signal.

By measuring the intensity noise in the information band that is on the combined pump light.

Figure 5:
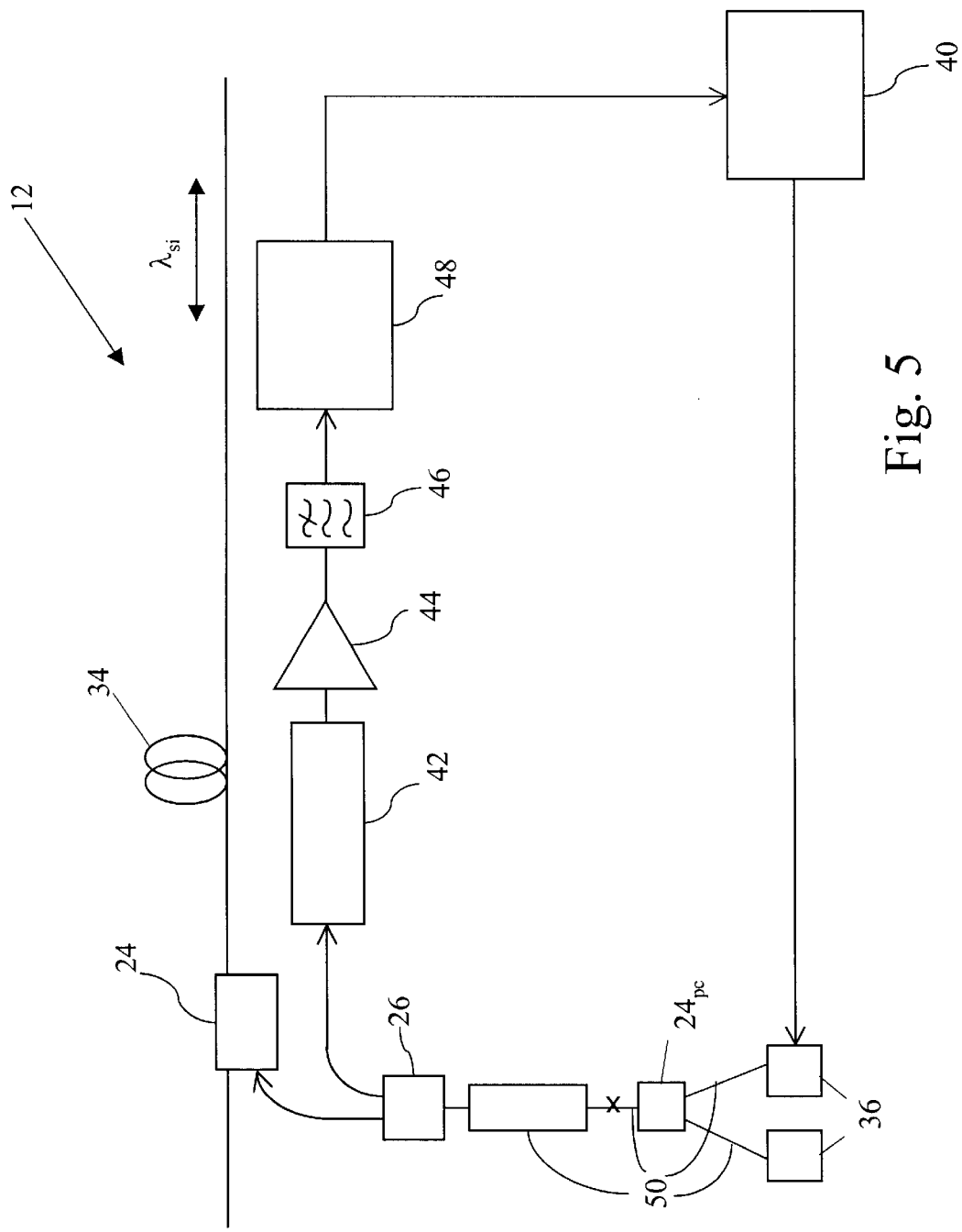

FIG. 5 schematic shows a circuit for performing the second method. As shown, an optical distributor 26 is used to tap off a fraction of the aggregate pump power. An optical to electrical converter 42, such as a photodetector, converts the power to an electrical current. An electrical amplifier 44 can be provided to amplify the detected current. An appropriate filter 46 is provided to filter the frequency range that includes the noise frequency of interest. The output of the filter is provided to an appropriate electrical frequency detector 48, the output of which is provided to the wavelength controller 40. As further shown in FIG. 5, polarization maintaining fiber 50 can be used to depolarize the pump power, when multiple wavelength ranges are combined.

If there are spectral components, or modes, of the pump light that are orthogonally polarized relative to each other, then these components will not beat in the photodetector and the error signal will be deceptively low. In this case, the polarization states of the spectral components that make up the pump light can be changed before the photodetector to increase the number of modes that beat in the photodetector, resulting in a more accurate error signal.

The error signal can be produced by varying the polarization states of the spectral components of the pump light could be changed any number of methods, such as 1. Propagate the pump light through the transmission fiber. The slight birefringence and polarization-mode dispersion (PMD) of the transmission fiber will shift the states of polarization of the spectral components of the pump light. Therefore, if the two components were polarized orthogonal to each other at the input end of the transmission fiber, they will not be orthogonal at the output end of the fiber and they will beat producing beat noise that will be detected as intensity noise in the photodetector.

2. After all the pump spectral components are combined onto one fiber, some of this aggregate pump light could be tapped off and coupled to a polarizer. The polarizer is oriented to pass some of the light from both of two orthogonally polarized spectral components of the pump light. At the output end of the polarizer, the light will not be polarized orthogonally and, and the non-orthogonal spectral components will beat in a photodetector and produce an error signal.

3. The previous method could be employed but with the polarizer replaced by some polarization-maintaining fiber (PMF). The PMF is oriented so that some of the light from both of two orthogonally polarized spectral components of the pump light are coupled to both polarization axes of the PMF. The birefringence of the PMF will shift the states of polarization of the spectral components of the pump light. Therefore, if the two components were polarized orthogonal to each other at the input end of the PMF, they will not be orthogonal at the output end and they will beat in the photodetector and produce an error signal. The length of PMF needed is on the order of a few meters or more of fiber. Also, in this method, the PMF could be placed before or after the tap.

Upon detection at a photodiode and subsequent amplification, the total noise may be measured using a microwave detector, such as a log video detector or a Shottky diode. This detector produces an output error voltage proportional to the total microwave power incident on the detector within its operating bandwidth. Log video detectors are currently available for 2.5 GHz operation; diode detectors are capable of operation beyond 18 GHz.

As the relative spacing of the pump spectral components increases, the center frequency of the noise increases. The bandwidth of the detection electronics (photodiode, amplifier, and microwave detector) may be tailored such that the detected error voltage will decrease as the noise moves beyond a desired frequency range. A control loop can use the detected error voltage to adjust the pump wavelengths to minimize the noise in the information bandwidth by minimizing the error voltage. For example, the control loop may adjust the temperature of one pump laser to maintain a minimum error voltage.

Also, a portion of the power from each of the optical sources being controlled can be tapped off before the pump power is combined. The tapped power from the sources can then be combined and using a non-polarization maintaining combiner and provided to the detector.

In practice, the present invention can be employed during calibration, installation, and/or operation of multiple optical sources. During calibration and installation, various test equipment can be employed to measure the optical noise. A wavelength controller can be used to vary one or more set points controlling the pump wavelength range of one or more of the multiple sources to achieve a desired noise level within a frequency range of interest. During operation, various control loop may or may not be employed to maintain the operation of the multiple source at the set point. In addition, the optical noise can be monitored during operation and the optical source wavelength actively controlled to control the optical noise generated by the modal interaction. For example, the temperature or the current set points can be controlled to achieve a specified noise level.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical system comprising:
    at least one optical transmitter;
    at least one optical receiver in optical communication with said optical transmitter; and,
    an optical amplifier providing optical communication between said optical transmitter and said optical receiver and including an optical amplifying medium;
    a pump source configured to provide optical energy to said optical amplifying medium, wherein said pump source includes:
    at least first and second optical sources providing optical energy in corresponding first and second wavelength ranges;
    an optical combiner having at least one port configured to receive the optical energy from said first and second optical sources and at least one port for providing optical energy combined from the optical energy of said first and second optical sources;
    a wavelength controller configured to vary at least one of the first and second wavelength ranges to decrease the optical noise produced in a frequency band by the combined optical energy; wherein:
    said at least first and second optical sources are semiconductor laser diodes; and,
    said wavelength controller is configured to vary at least one of the current provided to at least one of the first and second laser diodes and the temperature of at least one of the laser diodes to vary the optical noise in the information frequency band.

2. The system of claim 1, wherein said pump source is configured to provide optical energy in at least one of a counter-propagating and a co-propagating direction relative to the optical signal.

3. The system of claim 1, wherein said wavelength controller is configured to detect optical noise intensity.

4. An apparatus comprising:
    an optical amplifying medium configured to use optical energy to amplify optical signals;
    a pump source configured to provide optical energy to said optical amplifying medium, wherein said pump source includes:
    at least first and second optical sources providing optical energy in corresponding first and second wavelength ranges;
    an optical combiner configured to combine the optical energy from said first and second optical sources provided to a plurality of inputs and provide the combined optical energy to an output;
    a wavelength controller configured to detect optical noise in a frequency band produced by the combined optical energy and vary at least one of the first and second wavelength ranges to vary the optical noise in the frequency band;
    wherein said wavelength controller is configured to detect optical noise intensity and vary at least one of the current provided to at least one of the first and second laser diodes and the temperature of at least one of the laser diodes to vary the optical noise intensity in the frequency band.

5. An apparatus comprising:
    an optical amplifying medium configured to use optical energy to amplify optical signals;
    a pump source configured to provide optical energy to said optical amplifying medium, wherein said pump source includes:
    at least first and second optical sources providing optical energy in corresponding first and second wavelength ranges;
    an optical combiner configured to combine the optical energy from said first and second optical sources provided to a plurality of inputs and provide the combined optical energy to an output;
    a wavelength controller configured to detect optical noise in a frequency band produced by the combined optical energy and vary at least one of the first and second wavelength ranges to vary the optical noise in the frequency band;

wherein said wavelength controller includes:

a photodetector having an optical input in optical communication with said optical combiner output and an electrical output;

a processor having an input in communication with said photodetector electrical output, an output in communication with said optical sources and being configured to detect optical noise intensity and vary at least one of the current provided to at least one of the first and second optical sources and the temperature of at least one of the optical sources.

6. The apparatus of claim 5, further comprising:

an electrical amplifier having an input electrically connected to said photodetector output and an output;

an electrical detector having an input electrically connected to said amplifier output and an output electrically connected to said processor input.

7. The apparatus of claim 4, wherein said wavelength controller includes a detector for detecting noise carried by the optical energy supplied by the pump source.

8. The apparatus of claim 7, wherein said detector is connected optically to said pump source before said amplifying medium.

9. The apparatus of claim 7, wherein said detector is connected optically to detect pump power after said amplifying medium.

10. The apparatus of claim 4, wherein said wavelength controller includes a detector for detecting noise carried by an optical signal being amplified in said amplifying medium.

11. The apparatus of claim 4, wherein said wavelength controller includes a processor configured to vary the current supplied to at least one of said optical sources.

12. The apparatus of claim 4, wherein said wavelength controller includes a processor configured to vary the temperature of at least one of said optical sources.

* * * * *